United States Patent
Omiya

(10) Patent No.: US 8,462,933 B2
(45) Date of Patent: Jun. 11, 2013

(54) METHOD, DEVICE, AND PROGRAM FOR CALCULATING NUMBER OF OPERATORS NEEDED

(75) Inventor: Toshiyuki Omiya, Tokyo (JP)

(73) Assignee: P&W Solutions Co., Ltd., Tokyo (JP)

( * ) Notice: Subject to any disclaimer, the term of this patent is extended or adjusted under 35 U.S.C. 154(b) by 985 days.

(21) Appl. No.: 12/524,318

(22) PCT Filed: Jan. 25, 2008

(86) PCT No.: PCT/JP2008/051047
§ 371 (c)(1),
(2), (4) Date: Jul. 23, 2009

(87) PCT Pub. No.: WO2008/093601
PCT Pub. Date: Aug. 7, 2008

(65) Prior Publication Data
US 2010/0027779 A1    Feb. 4, 2010

(30) Foreign Application Priority Data
Jan. 31, 2007 (JP) ................................ 2007-020909

(51) Int. Cl.
*H04M 3/00* (2006.01)
*H04M 5/00* (2006.01)

(52) U.S. Cl.
USPC ............ 379/265.02; 379/265.06; 379/265.08; 379/266.06

(58) Field of Classification Search
USPC .............. 379/265.01–265.02, 266.01–266.08
See application file for complete search history.

(56) References Cited

U.S. PATENT DOCUMENTS

| | | | |
|---|---|---|---|
| 5,911,134 A * | 6/1999 | Castonguay et al. | 379/112.01 |
| 6,333,979 B1 * | 12/2001 | Bondi et al. | 379/219 |
| 2003/0095652 A1 * | 5/2003 | Mengshoel et al. | 379/265.06 |
| 2005/0065837 A1 * | 3/2005 | Kosiba et al. | 705/9 |
| 2005/0160142 A1 * | 7/2005 | Whitman, Jr. | 709/205 |

FOREIGN PATENT DOCUMENTS

JP    2002-77250    3/2002

OTHER PUBLICATIONS

Chiaki Hishinuma, "Theoretically Elucidating Connectibility of Contact Center" Tokyo University of Technology, [searched on Aug. 21, 2006]. <http://www.teu.ac.jp/hishi/erlang/kaisetsu2.pdf>.
Hisaya Taniuchi, "Jissen! Call Center Operation vol. 5", Computer Telephony, Jan. 20, 2000, vol. 3, No. 2, pp. 61-62.
Yoji Takeuchi, "CTI System-ka Giho vol. 7", Computer Telephony, Jul. 20, 1999, vol. 2, No. 7, pp. 72-73.
International Search Report for International Application No. PCT/JP2008/051047, Apr. 22, 2008.

* cited by examiner

*Primary Examiner* — Rasha Al Aubaidi
*Assistant Examiner* — Nafiz E Hoque
(74) *Attorney, Agent, or Firm* — Hoffmann & Baron, LLP

(57) ABSTRACT

A workforce requirement calculation device 10 accepts at least call volume in a particular period of time, an average handle time for a call by the operator, and a maximum queuing time before abandoning queuing of a call, as input parameters, initializes a number of the operators, calculates a probability of queuing of the call using the Erlang C formula based upon at least the call volume and the number of the operators, calculates a call abandonment rate as a service objective based upon at least the probability of queuing of the call and the input parameters, and calculates the workforce requirement for operators in order to meet a predetermined service objective by recurrently repeating the calculation of the probability of queuing of the call and the calculation of the call abandonment rate, with respect to an increase and a decrease in the number of the operators.

12 Claims, 6 Drawing Sheets

FIG. 6

AVAILABILITY SETTING FOR EACH DAY OF THE WEEK AND EACH WORKING SHIFT

|      | AM   | PM   | Night | Midnight |
|------|------|------|-------|----------|
| MON: | 80 % | 85 % | 80 %  | 75 %     |
| TUE: | 85 % | 85 % | 85 %  | 80 %     |
| WED: | 85 % | 85 % | 85 %  | 80 %     |
| THU: | 85 % | 85 % | 85 %  | 80 %     |
| FRI: | 80 % | 80 % | 70 %  | 70 %     |
| SAT: | 70 % | 70 % | 65 %  | 65 %     |
| SUN: | 80 % | 80 % | 80 %  | 80 %     |

[REGISTRATION]

FIG. 7

ABSENCE RATE SETTING FOR EACH DAY OF THE WEEK AND EACH WORKING SHIFT

|      | AM  | PM  | Night | Midnight |
|------|-----|-----|-------|----------|
| MON: | 5 % | 3 % | 5 %   | 7 %      |
| TUE: | 3 % | 3 % | 3 %   | 5 %      |
| WED: | 3 % | 3 % | 3 %   | 5 %      |
| THU: | 3 % | 3 % | 3 %   | 5 %      |
| FRI: | 5 % | 5 % | 8 %   | 8 %      |
| SAT: | 8 % | 8 % | 10 %  | 10 %     |
| SUN: | 5 % | 5 % | 5 %   | 5 %      |

[REGISTRATION]

METHOD, DEVICE, AND PROGRAM FOR CALCULATING NUMBER OF OPERATORS NEEDED

CROSS-REFERENCE TO RELATED APPLICATIONS

This application is the National Stage of International Application No. PCT/JP2008/051047, which designates the U.S., filed Jan. 25, 2008, which claims the benefit of JP2007-020909, filed Jan. 31, 2007, the contents of which are incorporated by reference herein.

TECHNICAL FIELD

The present invention relates to a method, device and program for calculating a workforce requirement for operators in a contact center.

BACKGROUND ART

In recent years, a contact center (call center) as a support call desk for customers has been occupying an important position in companies. In particular, connectibility of a contact center is extremely important for service objectives and for improving customer satisfaction as a result thereof. For example, if customers call a contact center many times but do not get any answer, customer satisfaction will eventually decrease and thus lead to losing a large number of customers and business opportunities.

Under such circumstances, connectibility of the contact center is being studied for improvement and optimization. For example, in Patent Document 1, a network facility amount calculating device is disclosed in which traffic theory is applied to combine data volumes for each application program for calculating an optimal facility amount in an IP network. In addition, Non-Patent Document 1 discloses a method for calculating traffic issues in a contact center such as the numbers of external lines, extensions, and seats for agents, based on call volume, a lost-call rate, an average queuing time, and the like.

Patent Document 1: Japanese Unexamined Patent Application Publication No. 2002-77250

Non-Patent Document 1: Chiaki Hishinuma, "Contact Center no Tsunagari Yasusa wo Riron-teki ni Kaimei Suru (Theoretically Elucidating Connectibility of Contact Center)", [online], Tokyo University of Technology, [searched on Aug. 21, 2006], Internet <http://www.teu.ac.jp/hishi/erlang/kaisetsu2.pdf>

DISCLOSURE OF THE INVENTION

Problems to be Solved by the Invention

However, in the device disclosed in Patent Document 1, a workforce requirement for agents (operators or communicators) is not a subject for optimization. In addition, in Non-Patent Document 1, the number of extensions is calculated by a theoretical M/M/c model; however, in an actual operational environment, there are many cases where preconditions of the theoretical model are not fulfilled. In particular, a condition where a customer in queue waits forever without abandoning a call is extremely unlikely.

Furthermore, in Non-Patent Document 1, an average queuing time is used as a service objective; however, it is necessary to consider many other factors, and adjustment is made using actual measured values of these factors. This method performs optimization during actual operation, and thus appropriate planning is not possible at the beginning of operation.

Given this, the present invention aims at providing a method for calculating the number of necessary operators in order to meet set service objectives, in a model that simulates an actual operating environment using a call abandonment rate.

Means for Solving the Problems

More specifically, the present invention provides the following to this end.

In a first aspect of the present invention, a method for calculating a workforce requirement for operators in a contact center by a computer, includes steps of:

accepting at least call volume in a particular period of time, an average handle time for a call by the operator, and a maximum queuing time before abandoning queuing of a call, as input parameters;

initializing a number of the operators;

calculating a probability of queuing of the call using the Erlang C formula based upon at least the call volume and the number of the operators;

calculating a call abandonment rate as a service objective based upon at least the probability of queuing of the call and the input parameters; and calculating the workforce requirement for operators in order to meet a predetermined service objective by recurrently repeating the step of calculating the probability of queuing of the call and the step of calculating the call abandonment rate, with respect to an increase and a decrease in the number of operators.

According to such a configuration, the computer: accepts at least call volume in a particular period of time, an average handle time for a call by the operator, and a maximum queuing time before abandoning queuing of a call, as input parameters; initializes a number of the operators; calculates a probability of queuing of the call using the Erlang C formula based upon at least the call volume and the number of the operators; calculates a call abandonment rate as a service objective based upon at least the probability of queuing of the call and the input parameters; and calculates the workforce requirement for operators in order to meet a predetermined service objective by recurrently repeating the calculation of the probability of queuing of the call and the calculation of the call abandonment rate, with respect to an increase and a decrease in the number of the operators.

This allows for calculation of the workforce requirement for operators in order to meet a predetermined service objective indicated by a call abandonment rate, based upon a theoretical model.

According to a second aspect of the present invention, in the method as described in the first aspect, the computer calculates the call abandonment rate by multiplying a probability that the average handle time, which is calculated under an assumption that handle time of the operator is exponentially-distributed, is at least the maximum queuing time, by the probability of queuing of the call.

According to such a configuration, the computer can specifically define a call abandonment rate as a service objective, which can be referred to as a criterion for calculation of a workforce requirement for operators. Thus, the set service objective is reflected in the workforce requirement, and consequently, the workforce requirement for improving customer satisfaction can be determined.

According to a third aspect of the present invention, the method as described in the first or second aspect further includes steps of the computer: calculating a response rate within a set period of time as a second service objective based upon the probability of queuing of the call; and calculating the workforce requirement for operators in order to meet a predetermined service objective by recurrently repeating the step of calculating the probability of queuing of the call and the step of calculating the response rate within a set period of time with respect to an increase and a decrease in the number of the operators.

According to such a configuration, the computer calculates a response rate within a set period of time as a second service objective based upon the probability of queuing of the call, and calculates the workforce requirement for operators in order to meet a predetermined service objective by recurrently repeating the calculation of the probability of queuing of the call and the calculation of the response rate within a set period of time with respect to an increase and a decrease in the number of the operators.

Since the response rate within a set period of time is added as another criterion of the service objective, more detailed setting is possible than in the first and second aspects for improving customer satisfaction.

According to a fourth aspect of the present invention, the method as described in any one of the first to third aspects further includes steps of the computer: accepting an input of availability of the operators for each day of the week and for each predetermined period of time of day; and adjusting the workforce requirement for operators according to the availability.

According to such a configuration, the computer accepts an input of availability of the operators for each day of the week and for each predetermined period of time of day, and adjusts the workforce requirement for operators according to the availability.

This allows the availability for each day of the week and for each working shift (working form) to be considered for calculating the workforce requirement, thereby providing a more practical and effective result in consideration of periods of time where the operator cannot serve as an operator due to, for example, a time for recess, meetings and the like.

According to a fifth aspect of the present invention, the method as described in any one of the first to fourth aspects further includes steps of the computer: accepting an input of absence rate of the operators for each day of the week and for each predetermined period of time of day; and adjusting the workforce requirement for operators according to the absence rate.

According to such a configuration, the computer accepts an input of absence rate of the operators for each day of the week and for each predetermined period of time of day, and adjusts the workforce requirement for operators according to the absence rate.

This allows the absence rate for each day of the week and for each working shift (working form) to be considered for calculating the workforce requirement, thereby providing a more practical and effective result in consideration of the absence rate that is not constant and can be higher, for example, in a specific period of time and season.

In a sixth aspect of the present invention, a device for calculating a workforce requirement for operators in a contact center includes:

a unit configured to accept at least call volume in a particular period of time, an average handle time for a call by the operator, and a maximum queuing time before abandoning queuing of a call, as input parameters;

a unit configured to initialize a number of the operators;

a unit configured to calculate a probability of queuing of the call using the Erlang C formula based upon at least the call volume and the number of the operators;

a unit configured to calculate a call abandonment rate as a service objective based upon at least the probability of queuing of the call and the input parameters; and a unit configured to calculate the workforce requirement for operators in order to meet a predetermined service objective by recurrently repeating the calculation of the probability of queuing of the call and the calculation of the call abandonment rate, with respect to an increase and a decrease in the number of the operators.

According to such a configuration, an effect similar to that described in the first aspect can be expected by operating the device.

According to a seventh aspect of the present invention, the device as described in the sixth aspect calculates the call abandonment rate by multiplying a probability that the average handle time, which is calculated under an assumption that handle time of the operator is exponentially-distributed, is at least the maximum queuing time, by the probability of queuing of the call.

According to such a configuration, an effect similar to that described in the second aspect can be expected by operating the device.

According to an eighth aspect of the present invention, the device as described in the sixth or seventh aspect further includes: a unit configured to calculate a response rate within a set period of time as a second service objective based upon the probability of queuing of the call; and a unit configured to calculate the workforce requirement for operators in order to meet a predetermined service objective by recurrently repeating the calculation of the probability of queuing of the call and the calculation of the response rate within a set period of time with respect to an increase and a decrease in the number of the operators.

According to such a configuration, an effect similar to that described in the third aspect can be expected by operating the device.

According to a ninth aspect of the present invention, the device as described in any one of the sixth to eighth aspects further includes: a unit configured to accept an input of availability of the operators for each day of the week and for each predetermined period of time of day; and a unit configured to adjust the workforce requirement for operators according to the availability.

According to such a configuration, an effect similar to that described in the fourth aspect can be expected by operating the device.

According to a tenth aspect of the present invention, the device as described in any one of the sixth to ninth aspects further includes: a unit configured to accept an input of absence rate of the operators for each day of the week and for each predetermined period of time of day; and a unit configured to adjust the workforce requirement for operators according to the absence rate.

According to such a configuration, an effect similar to that described in the fifth aspect can be expected by operating the device.

According to an eleventh aspect of the present invention, in a computer program for calculating a workforce requirement for operators in a contact center by a computer, the computer program causes the computer to execute steps of:

accepting at least call volume in a particular period of time, an average handle time for a call by the operator, and a maximum queuing time before abandoning queuing of a call, as input parameters;

initializing a number of the operators;

calculating a probability of queuing of the call using the Erlang C formula based upon at least the call volume and the number of the operators;

calculating a call abandonment rate as a service objective based upon at least the probability of queuing of the call and the input parameters; and calculating the workforce requirement for operators in order to meet a predetermined service objective by recurrently repeating the step of calculating the probability of queuing of the call and the step of calculating the call abandonment rate, with respect to an increase and a decrease in the number of the operators.

According to such a configuration, an effect similar to that described in the first aspect can be expected by causing the computer program to be executed on a computer.

According to a twelfth aspect of the present invention, in the computer program as described in the eleventh aspect, the computer program causes the computer to calculate the call abandonment rate by multiplying a probability that the average handle time, which is calculated under an assumption that handle time of the operator is exponentially-distributed, is at least the maximum queuing time, by the probability of queuing of the call.

According to such a configuration, an effect similar to that described in the second aspect can be expected by causing the computer program to be executed on a computer.

According to a thirteenth aspect of the present invention, in the computer program as described in the eleventh or twelfth aspect, the computer program causes the computer to further execute steps of: calculating a response rate within a set period of time as a second service objective based upon the probability of queuing of the call; and calculating the workforce requirement for operators in order to meet a predetermined service objective by recurrently repeating the step of calculating the probability of queuing of the call and the step of calculating the response rate within a set period of time with respect to an increase and a decrease in the number of the operators.

According to such a configuration, an effect similar to that described in the third aspect can be expected by causing the computer program to be executed on a computer.

According to a fourteenth aspect of the present invention, in the computer program as described in any one of the eleventh to thirteenth aspects, the computer program causes the computer to further execute steps of: accepting an input of availability of the operators for each day of the week and for each predetermined period of time of day; and adjusting the workforce requirement for operators according to the availability.

According to such a configuration, an effect similar to that described in the fourth aspect can be expected by causing the computer program to be executed on a computer.

According to a fifteenth aspect of the present invention, in the computer program as described in any one of the eleventh to fourteenth aspects, the computer program causes the computer to further execute steps of: accepting an input of absence rate of the operators for each day of the week and for each predetermined period of time of day; and adjusting the workforce requirement for operators according to the absence rate.

According to such a configuration, an effect similar to that described in the fifth aspect can be expected by causing the computer program to be executed on a computer.

Effects of the Invention

According to the present invention, a method for calculating the number of necessary operators in order to meet set service objectives, in a model that simulates an actual operating environment using a call abandonment rate, can be provided.

BRIEF DESCRIPTION OF THE DRAWINGS

FIG. 6 is a diagram showing a display example of a detailed input window of availability, regarding an example of a preferred embodiment of the present invention; and FIG. 7 is a diagram showing a display example of a detailed input window of absence rate, regarding an example of a preferred embodiment of the present invention.

PREFERRED MODE FOR CARRYING OUT THE INVENTION

An example of a preferred embodiment of the present invention is described hereinafter with reference to the drawings.

Functional Configuration

Figure 1:
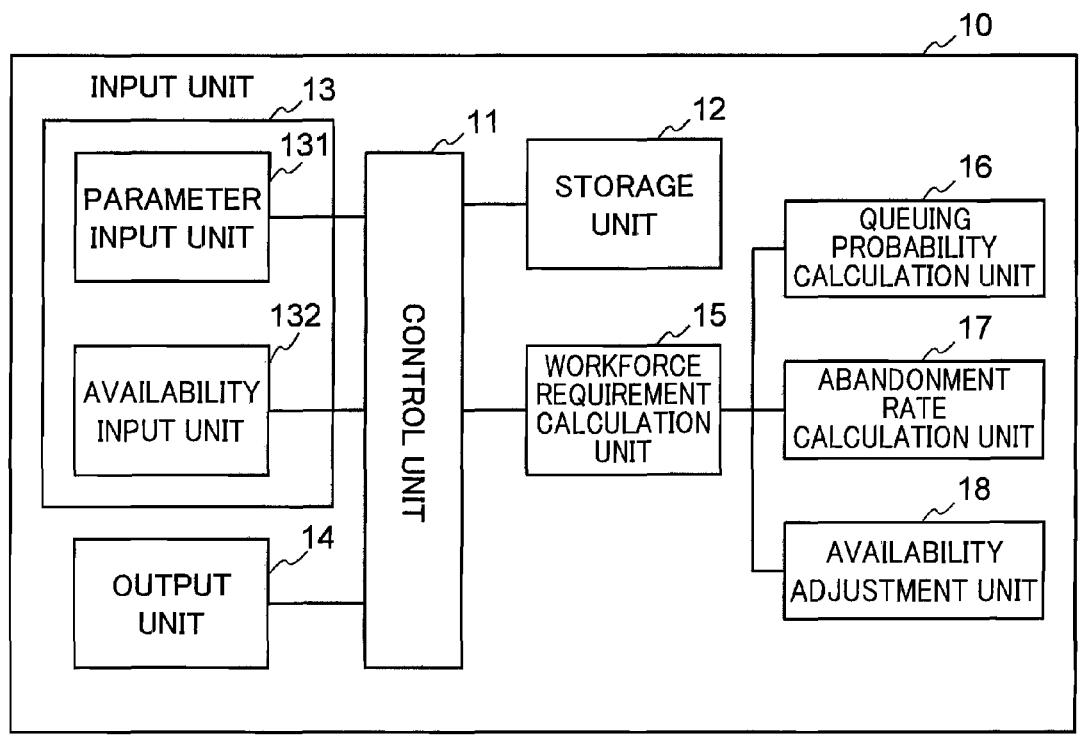
FIG. 1 is a block diagram showing a functional configuration of a workforce requirement calculation device 10 according to an example of a preferred embodiment of the present invention.

FIG. 1 is a block diagram showing a functional configuration of a workforce requirement calculation device 10 according to an example of a preferred embodiment of the present invention.

The workforce requirement calculation device 10 is composed of a control unit 11, a storage unit 12, an input unit 13, an output unit 14, a workforce requirement calculation unit 15, a queuing probability calculation unit 16, an abandonment rate calculation unit 17, and an availability adjustment unit 18. The control unit 11 accepts an input from a user via the input unit 13, allows the workforce requirement calculation unit 15 to calculate the workforce requirement, and then displays a result thereof on the output unit 14.

The control unit 11, which is an information processor (CPU) computing and processing information, controls the overall workforce requirement calculation device 10. The control unit 11 reads and executes various programs stored in the storage unit 12 accordingly, thereby cooperating with the abovementioned hardware and implementing various functions according to the present invention.

The storage unit 12 may include local memory used for executing the programs in combination with the control unit 11, large capacity bulk memory, and cache memory used for efficiently searching in the bulk memory. Then, the storage unit 12 stores various programs executed by the control unit 11. An example of a computer readable medium (storage medium) that constitutes the storage unit 12 can include media that electrically, magnetically, optically, or electromagnetically realizes the storage unit 12. More specifically, included are a semiconductor memory device, a magnetic tape, a magnetic disk, a random-access memory (RAM), a read-only memory (ROM), and an optical disk including a CD-ROM, a CD-R/W, and a DVD.

The input unit 13 further includes a parameter input unit 131 and an availability input unit 132. The parameter input unit 131 is a means for accepting a parameter input by a user to allow the workforce requirement calculation device 10 to calculate the workforce requirement, and the availability input unit 132 is a means for accepting an availability input by a user to adjust the calculated workforce requirement. More specifically, the input unit 13 can be a keyboard, a pointing device or the like, which can be directly connected to the workforce requirement calculation device 10, or via an I/O controller.

The output unit 14 is a means for displaying a window on which data input is accepted for the user, and for displaying a window of an arithmetic processing result from the control unit 11, and includes display devices such as a cathode-ray tube (CRT), a liquid crystal display device (LCD), and the like. The output unit 14 can be directly connected to the workforce requirement calculation device 10, or via an I/O controller.

The workforce requirement calculation unit 15 calculates the workforce requirement for operators in a contact center, in cooperation with the queuing probability calculation unit 16, the abandonment rate calculation unit 17, and the availability adjustment unit 18. In this regard, the workforce requirement calculation unit 15 receives a parameter and the like necessary to calculate the workforce requirement via the input unit 13, and passes the value of the parameter and the like to the queuing probability calculation unit 16, the abandonment rate calculation unit 17, and the availability adjustment unit 18.

The queuing probability calculation unit 16 calculates a lost-call rate and a probability of queuing of a call. The abandonment rate calculation unit 17 calculates a call abandonment rate, in other words a probability at which queuing time exceeds the maximum queuing time that is defined in the parameter, based upon the probability of queuing of the call. Here, the workforce requirement calculation device 10 accepts an input from the user for setting the abandonment rate to a predetermined value, as a service objective.

The workforce requirement calculation unit 15 first calculates the workforce requirement using the queuing probability calculation unit 16 and the abandonment rate calculation unit 17 so that the abandonment rate meets the service objective, and then calculates the workforce requirement in consideration of the availability by way of the availability adjustment unit 18. It should be noted that workforce requirement calculation processing is later described in detail in FIGS. 2 to 4.

Workforce Requirement Calculation Processing (A)

Figure 2:
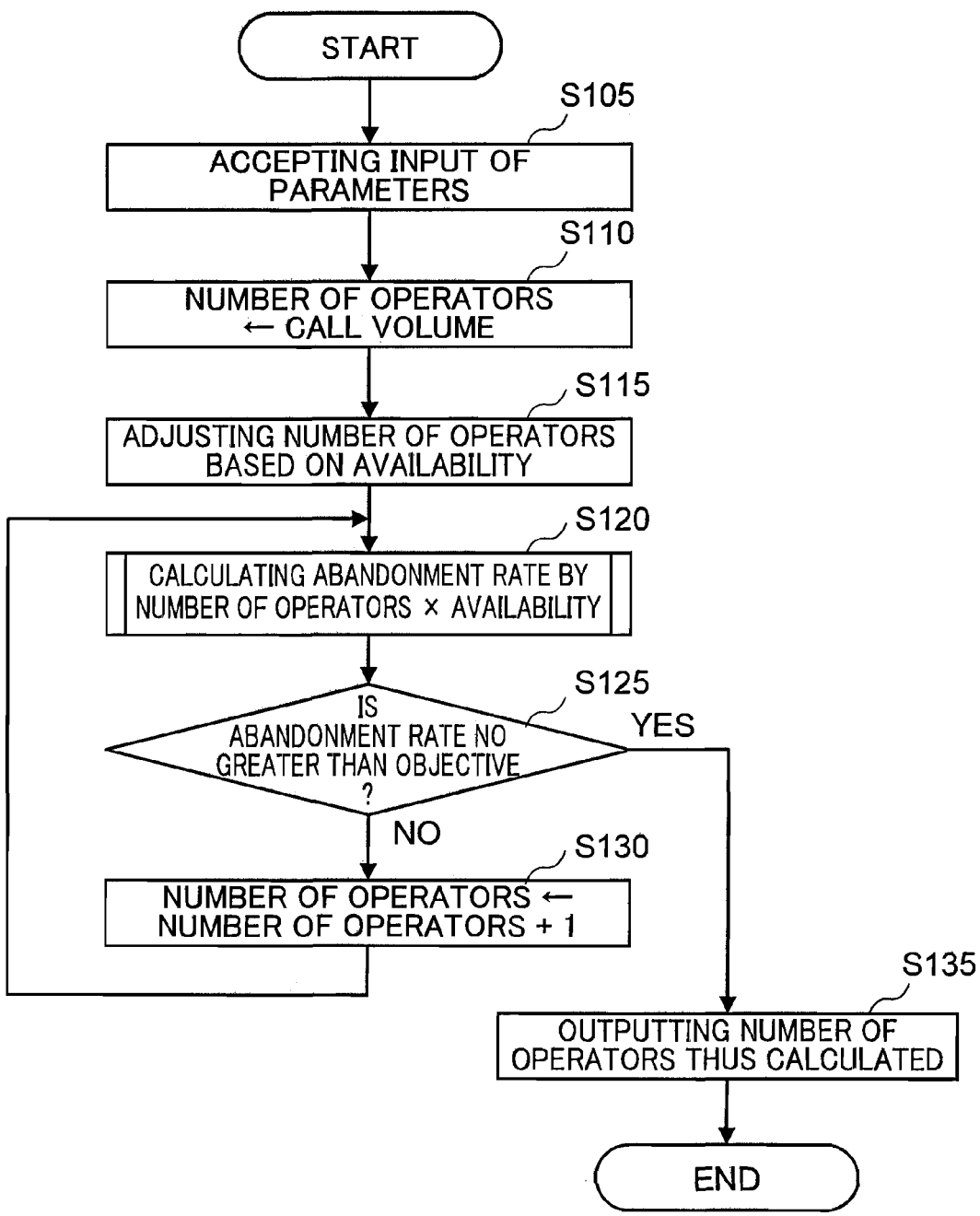
FIG. 2 is a diagram showing a flow of workforce requirement calculation processing (A) regarding an example of a preferred embodiment of the present invention.

FIG. 2 is a diagram showing a flow of workforce requirement calculation processing (A) regarding an example of a preferred embodiment of the present invention.

In Step S105, the control unit 11 receives an input of necessary parameters via the parameter input unit 131, and passes the parameter to the workforce requirement calculation unit 15. The parameters at least include expected call volume in the contact center, average handle time of operators, maximum queuing time, and an abandonment rate as a service objective.

The call volume used for the calculation may be either input from the user, or read from the storage unit 12 storing past statistics, upon acceptance of an input of date and time by the user. It should be noted that the call volume can be obtained by multiplying the number of calls per unit time (one second) by the average handle time.

In a case where the past statistics are used, for example, call volume data (call volume or the number of calls and the average handle time) may be stored in relation to calendar information (date, week, month and the like), divisions of campaign (service) or the like, and read upon acceptance of an input of selection by the user.

The call volume data may be a daily average value; however, using values per predetermined periods of time, such as per hour, transition of workforce requirement during a day in accordance with an increase and decrease in call volume can be determined. It should be noted that, after reading the past statistics, values are preferably adjusted by accepting an input from the user.

This can simplify input operations by the user while providing a highly reliable input parameter by using the past statistics.

In Step S110, the workforce requirement calculation unit 15 initializes the number of operators. More specifically, the number can be substituted by a call volume value being a parameter or can be set to 1, for example.

In Step S115, the availability adjustment unit 18 adjusts the number of operators, which is set in Step S110, in accordance with availability. As used herein, availability is a ratio, for all of the assigned operators, of operators that are actually available for a predetermined service. Even if operators are assigned, work in their charge is not necessarily limited to that usually performed, and since there may be time taken for meetings, training, breaks, and the like, which are not work in their charge, an adjustment in accordance with availability is required. In addition, time for work other than their charge is not necessarily planned in advance, and may be accidentally taken for accepting visitors, handling emergencies, or the like. An incidence ratio thereof varies among operators.

As described above, regarding the availability, which may constantly change, a more accurate workforce requirement for operators, which is obtained by correcting a theoretical value, can be calculated by adjusting the workforce requirement on the basis of a user's empirical rules and past statistics.

More specifically, the workforce requirement is obtained by dividing the number of operators by a predetermined availability, and rounding a result thereof. The availability is input by a user via the availability input unit 132 to the control unit 11. Input of the availability can be accepted in advance of calculation of workforce requirement.

The availability can be a constant value or input in various forms, such as a value for each day of the week, a value for each hour, or the like. By setting the availability to a smaller unit of time, more accurate results may be obtained.

Thereafter, the workforce requirement calculation unit 15 repeats the successive processing (Step S120 to Step S130), thereby increasing the number of operators to a necessary number in consideration of the availability.

In Step S120, the workforce requirement calculation unit 15 calculates a call abandonment rate, in cooperation with the queuing probability calculation unit 16 and the abandonment rate calculation unit 17. Here, the abandonment rate is calculated with respect to actual workforce in consideration of the availability (a value obtained by multiplying the number of operators by the availability). The processing is later described in detail in FIG. 3.

In Step S125, the workforce requirement calculation unit 15 determines whether the abandonment rate, which is calculated in Step S120, meets the service objective (whether the abandonment rate is no greater than a target value). In a case where the abandonment rate is no greater than the target value (the abandonment rate meets the service objective), processing is advanced to Step S135, and in a case where the abandonment rate exceeds the target value (the abandonment rate does not meet the service objective), processing is advanced to Step S130.

In Step S130, the workforce requirement calculation unit 15 increments the number of operators by one, and then processing is returned to Step S120. Since the abandonment rate decreases as the number of operators increases (later described in FIG. 3), the abandonment rate can reach the target value by repeating Step S120 to Step S130, thereby calculating a lower limit of the number of operators in order to meet the service objective.

In Step S135, the control unit 11 receives a result of workforce requirement calculation in Steps S110 to S130 from the workforce requirement calculation unit 15, and displays the results of calculation via the output unit 14.

It should be noted that, in the present embodiment, an adjustment by the availability is made in Steps S110 to S115; however, the adjustment can be made by accepting an input of the availability from a user, after displaying a workforce requirement for operators without considering the availability via the output unit 14.

Abandonment Rate Calculation Processing

Figure 3:
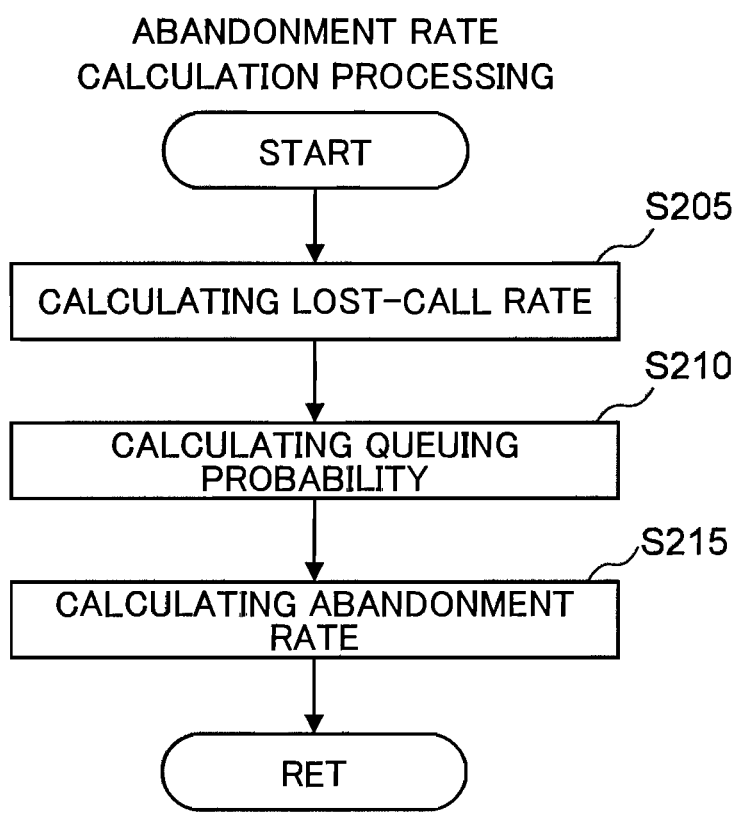
FIG. 3 is a diagram showing a flow of abandonment rate calculation processing regarding an example of a preferred embodiment of the present invention.

FIG. 3 is a diagram showing a flow of abandonment rate calculation processing regarding an example of a preferred embodiment of the present invention.

In Step S205, the queuing probability calculation unit 16 calculates a lost-call rate. As used herein, the lost-call rate is the ratio of the lost call volume to the input call volume. In other words, it is the ratio of calls that tried to make a connection but failed because lines were busy, and is a numerical value indicating connectibility of phone calls for customers.

The lost-call rate is calculated by the following recurrence equation (Equation 1).

$$\begin{cases} E_c(a) = \dfrac{aE_{c-1}(a)}{c + aE_{c-1}(a)} \\ E_0(a) = 1 \end{cases} \quad \text{(Equation 1: Erlang B formula)}$$

Here, c is the number of operators. a is a call volume, which is obtained by multiplying the number of calls per unit time (one second) by the average handle time.

In Step S210, the queuing probability calculation unit 16 calculates a probability of queuing of a call based upon the lost-call rate. Here, applying an M/M/c model, the probability of queuing of a call (M) is calculated by substituting the lost-call rate determined in Step S205 into Equation 2 below.

$$M = \frac{cE_c(a)}{c - a + aE_c(a)} \quad \text{(Equation 2: Erlang C formula)}$$

In Step S215, the abandonment rate calculation unit 17 receives the probability of queuing of a call calculated in Step S210, and calculates the abandonment rate of a call. More specifically, the call abandonment rate (S), as a probability of the queuing time being at least the maximum queuing time, is calculated using Equation 3, based on the M/M/c model, under an assumption that handle time of the operator is exponentially-distributed.

$$S = M \cdot e^{\frac{(a-c)h}{AHT}} \quad \text{(Equation 3)}$$

Here, h is the maximum queuing time and AHT is an average handle time, which are received in Step S105 (FIG. 2) as parameters. It should be noted that the average handle time includes ACW (after call work).

Workforce Requirement Calculation Processing (B)

Figure 4:
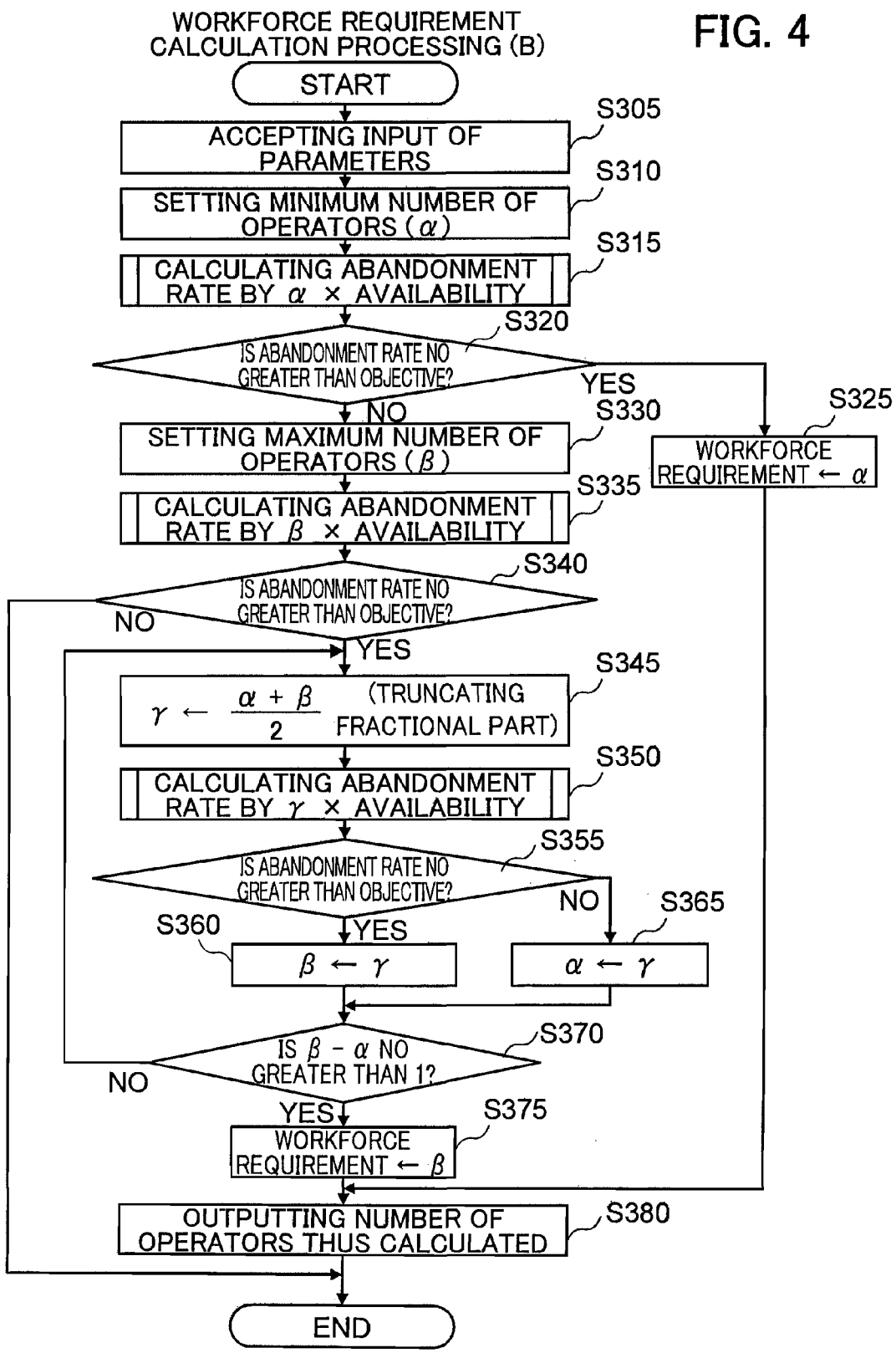
FIG. 4 is a diagram showing a flow of workforce requirement calculation processing (B) regarding an example of a preferred embodiment of the present invention.

FIG. 4 is a diagram showing a flow of workforce requirement calculation processing (B) regarding an example of a preferred embodiment of the present invention. In the workforce requirement calculation processing (A), processing is recurrently performed by incrementing the number of operators by one; however, a calculation method is not limited thereto and other methods may be adopted in order to improve the efficiency of the processing. In the present processing, a bisection method is adopted as an example.

In Step S305, the control unit 11 accepts an input of a necessary parameter, similarly to Step S105 (FIG. 2).

In Step S310, the workforce requirement calculation unit 15 sets a minimum number of operators ($\alpha$) as an initial value. More specifically, the number can be substituted by a value obtained by dividing the call volume by the availability and rounding a result thereof, or can be set to 1, for example.

In Step S315, the workforce requirement calculation unit 15 calculates the abandonment rate, in a case where the number of operator is $\alpha$, by the abandonment rate calculation processing (FIG. 3). Here, the abandonment rate is calculated by using the number of operators multiplied by the availability.

In Step S320, the workforce requirement calculation unit 15 determines whether the abandonment rate, which is calculated in Step S315, is no greater than a target value. In a case where the abandonment rate is no greater than the target value (the abandonment rate meets the service objective), processing is advanced to Step S325, and in a case where the abandonment rate exceeds the target value (the abandonment rate does not meet the service objective), processing is advanced to Step S330.

In Step S325, the workforce requirement calculation unit 15 can determine that the service objective can be met with the minimum number of operators ($\alpha$) set in Step S310, and therefore the workforce requirement is set to $\alpha$. Then, the processing is advanced to Step S380.

In Step S330, the workforce requirement calculation unit 15 sets a maximum number of operators ($\beta$) as an initial value. More specifically for example, a maximum number possible in practice or other numbers that are large enough can be set.

In Step S335, the workforce requirement calculation unit 15 calculates the abandonment rate, in a case where the number of operator is $\beta$, by the abandonment rate calculation processing (FIG. 3). Here, the abandonment rate is calculated by using the number of operators multiplied by the availability.

In Step S340, the workforce requirement calculation unit 15 determines whether the abandonment rate, which is calculated in Step S335, is no greater than a target value. In a case where the abandonment rate is no greater than the target value (the abandonment rate meets the service objective), processing is advanced to Step S345, and in a case where the abandonment rate exceeds the target value (the abandonment rate does not meet the service objective), the number of operators that can meet the service objective cannot be calculated, and thus processing is terminated. In this case, since the target value exceeds a feasible limit, a message indicating that the calculation failed may be displayed by the output unit 14.

In Step S345, the workforce requirement calculation unit 15 obtains $\gamma$ as an intermediate value of $\alpha$ and $\beta$. $\gamma$ is an integer similarly to $\alpha$ and $\beta$, and can be obtained by truncating the fractional part.

In Step S350, the workforce requirement calculation unit 15 calculates the abandonment rate, in a case where the number of operator is γ, by the abandonment rate calculation processing (FIG. 3). Here, the abandonment rate is calculated by using the number of operators multiplied by the availability.

In Step S355, the workforce requirement calculation unit 15 determines whether the abandonment rate, which is calculated in Step S350, is no greater than a target value. In a case where the abandonment rate is no greater than the target value (the abandonment rate meets the service objective), processing is advanced to Step S360, and in a case where the abandonment rate exceeds the target value (the abandonment rate does not meet the service objective), processing is advanced to Step S365.

In Step S360, the workforce requirement calculation unit 15 substitutes γ into the maximum number of operators (β), and in Step S365, substitutes γ into the minimum number of operators (α). This can reduce a difference between α and β, while satisfying a condition that the number of operators in case α does not meet the service objective and the number of operators in case β meets the service objective.

In Step S370, the workforce requirement calculation unit 15 determines whether the difference between α and β is no greater than 1 (0 or 1). In a case where the difference is no greater than 1, the processing is advanced to Step S375, and in a case where the difference is at least 2, the processing of Steps S345 to S370 is repeated.

The abovementioned steps determine the number of operators, which is a boundary between meeting and not meeting the service objective. Therefore, in Step S375, the workforce requirement calculation unit 15 determines that β is a minimum value in order to meet the service objective and sets β as the workforce requirement.

In Step S380, the output unit 14 displays a result calculated in the abovementioned step, as in Step S135 (FIG. 2) of the workforce requirement calculation processing (A).

As described above, by the workforce requirement calculation processing (A) or (B), the workforce requirement for operators with which the call abandonment rate meets the service objective is calculated. Here, other than the call abandonment rate, an response rate within a set period of time can be set as the service objective. The response rate within a set period of time indicates a rate where an operator answers within a set period of time, and can be calculated by 1−S, S obtained by the abovementioned Equation 3 with h substituted by the set period of time.

By setting these criteria at a time, the service objective can be set in detail and the workforce requirement that fulfills one of these criteria, which is harder to fulfill than another, can be calculated.

Alternatively, a response rate (a rate at which an operator answers with no queuing) that can be calculated by 1−M, M being the probability of queuing of a call in Equation 2, can be set as the service objective.

Alternatively, an average queuing time (W), which can be calculated by the following Equation 4, can be set as the service objective.

$$W = \frac{AHT}{c-a} \cdot M$$ (Equation 4)

Display Example

Figure 5:
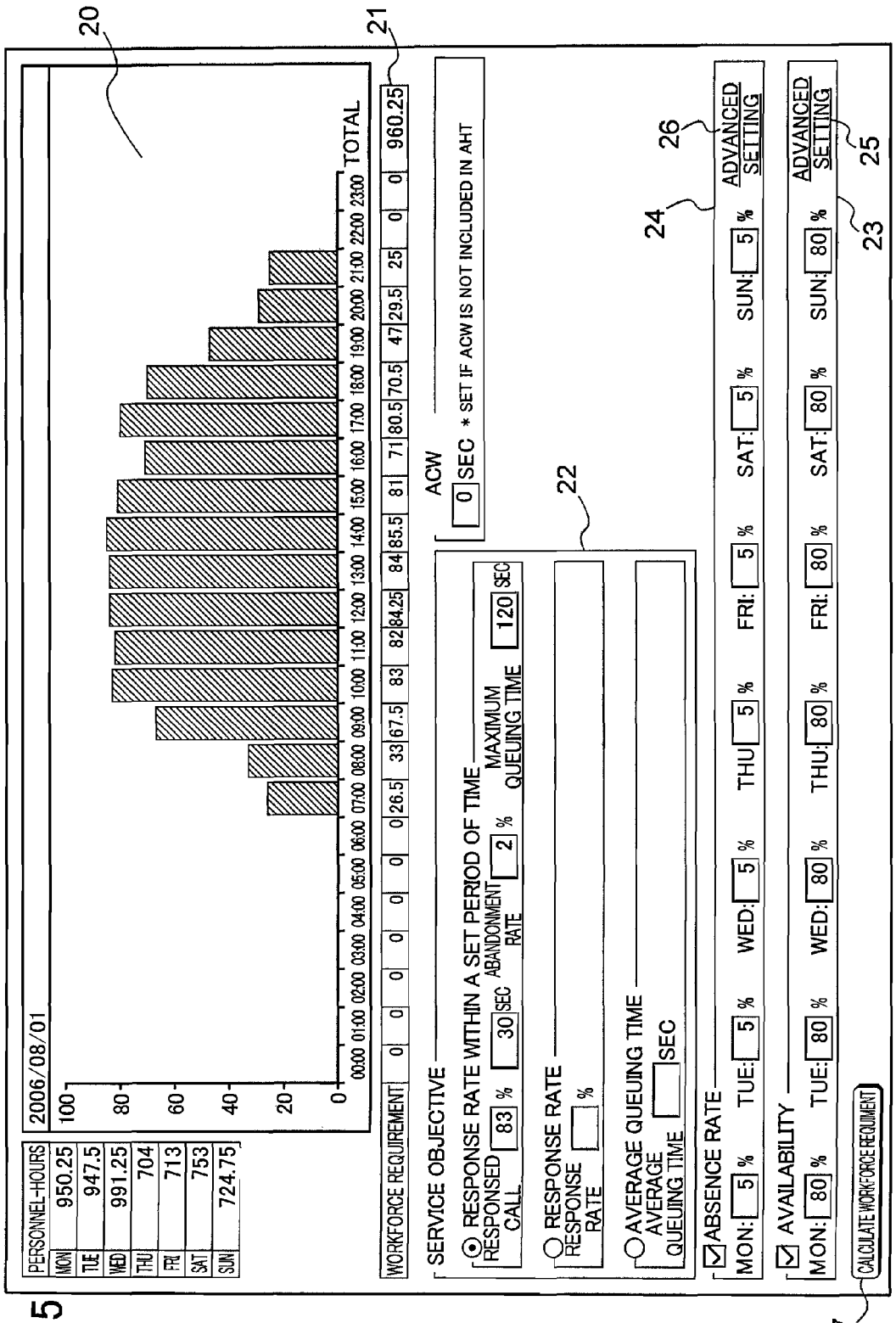
FIG. 5 is a diagram showing a display example of an input window and a result of a calculation of workforce requirement, regarding an example of a preferred embodiment of the present invention.

FIG. 5 is a diagram showing a display example of an input window and a result of a calculation of workforce requirement, regarding an example of a preferred embodiment of the present invention.

Selection of index for the service objective and an input of a parameter according to the selection is accepted via the service objective input field 22. For example, in a case where the response rate within a set period of time is selected, an input of the set period of time and the response rate within a set period of time, or an input of the maximum queuing time and the abandonment rate, is accepted.

An availability input field 23 is a field that accepts input of the abovementioned availability. In the present embodiment, an input of the availability for each day of the week is accepted. It should be noted that a mode of input is not limited thereto, and various modes such as input for each working shift (early shift, late shift and the like) can be adopted by dividing a day, for example.

FIG. 6 is an example of a detailed input window of availability, which is displayed upon depressing an advanced setting field 25 in FIG. 5. In FIG. 6, for example, the availability is input for each day of the week and for each shift, such as "Monday AM: 80%, PM: 85%, Night: 80%, Midnight: 75%".

Furthermore, as a parameter similar to availability, an absence rate can be entered via an absence rate input field 24. The absence rate indicates a rate of diminution in the planned number of operators due to paid leave, absence and the like. Regarding the absence rate, a value can be entered, for example, for each day of the week, and furthermore, for each working shift (early shift, late shift and the like) within a day.

FIG. 7 is an example of a detailed input window, which is displayed upon depressing an advanced setting field 26 in FIG. 5. In FIG. 7, for example, the absence rate is input for each day of the week and for each shift, as "Monday AM: 5%, PM: 3%, Night: 5%, Midnight: 7%".

As described above, by accepting entries of availability and absence rate of operators, the workforce requirement calculation device 10 can calculate the workforce requirement for personnel assignment planning, in consideration of operational status (availability and absence rate) that changes every day and every working shift.

Referring again to in FIG. 5, upon depressing a workforce requirement calculation button 27, the workforce requirement calculation device 10 calculates the workforce requirement for operators as described above and displays a result thereof as a result chart 20 and a result table 21.

The result chart 20 shows a result of calculation of workforce requirement per hour, and the result table 21 indicates specific numerical values thereof. It should be noted that a mode of display is not limited thereto and, for example, values for each day can be displayed. Alternatively, modes of display can be switched therebetween upon reception of a selection input from a user.

The preferred embodiment of the present invention has been described above; however, the present invention is not limited thereto. In addition, the effects described in the embodiment of the present invention simply list the most preferable effects derived from the present invention, and the effects of the present invention are not limited to the effects described in the embodiment of the present invention.

The invention claimed is:

1. A method for calculating a workforce requirement for operators in a contact center, the method comprising:
accepting, by a computing device, input parameters including at least a call volume in a particular period of time, an average handle time for a call by an operator, and a maximum queuing time before abandoning queuing of a call;

initializing, by the computing device, a number of the operators;

calculating, by the computing device, a probability of queuing of the call using an Erlang C formula based upon at least the call volume and the number of the operators;

calculating, by the computing device, a call abandonment rate as a service objective by multiplying the probability of queuing of the call and a probability that a handle time of the operator is at least the maximum queuing time in an exponential distribution, wherein the exponential distribution includes the maximum queuing time multiplied by a result of the call volume minus the number of the operators and further divided by the average handle time; and calculating, by the computing device, the workforce requirement for operators in order to meet a predetermined service objective by recurrently repeating the calculating of the probability of queuing of the call and the calculating of the call abandonment rate, with respect to an increase and a decrease in the number of the operators.

2. The method according to claim 1, further comprising:

calculating a response rate within a set period of time as a second service objective based upon the probability of queuing of the call; and calculating the workforce requirement for operators in order to meet a predetermined service objective by recurrently repeating the calculating of the probability of queuing of the call and the calculating of the response rate within a set period of time with respect to an increase and a decrease in the number of the operators.

3. The method according to claim 1, further comprising:

accepting an input of availability of the operators for each day of the week and for each predetermined period of time of the day; and adjusting the workforce requirement for operators according to the availability.

4. The method according to claim 1, further comprising:

accepting an input of absence rate of the operators for each day of the week and for each predetermined period of time of the day; and adjusting the workforce requirement for operators according to the absence rate.

5. A device for calculating a workforce requirement for operators in a contact center, the device comprising:

a unit configured to accept input parameters including at least a call volume in a particular period of time, an average handle time for a call by an operator, and a maximum queuing time before abandoning queuing of a call;

a unit configured to initialize a number of the operators;

a unit configured to calculate a probability of queuing of the call using an Erlang C formula based upon at least the call volume and the number of the operators;

a unit configured to calculate a call abandonment rate as a service objective by multiplying the probability of queuing of the call and a probability that a handle time of the operator is at least the maximum queuing time in an exponential distribution, wherein the exponential distribution includes the maximum queuing time multiplied by a result of the call volume minus the number of the operators and further divided by the average handle time; and a unit configured to calculate the workforce requirement for operators in order to meet a predetermined service objective by recurrently repeating the calculation of the probability of queuing of the call and the calculation of the call abandonment rate, with respect to an increase and a decrease in the number of the operators.

6. The device according to claim 5, further comprising:

a unit configured to calculate a response rate within a set period of time as a second service objective based upon the probability of queuing of the call; and a unit configured to calculate the workforce requirement for operators in order to meet a predetermined service objective by recurrently repeating the calculation of the probability of queuing of the call and the calculation of the response rate within a set period of time with respect to an increase and a decrease in the number of the operators.

7. The device according to claim 5, further comprising:

a unit configured to accept an input of availability of the operators for each day of the week and for each predetermined period of time of day; and a unit configured to adjust the workforce requirement for operators according to the availability.

8. The device according to claim 5, further comprising:

a unit configured to accept an input of absence rate of the operators for each day of the week and for each predetermined period of time of day; and a unit configured to adjust the workforce requirement for operators according to the absence rate.

9. A non-transitory computer-readable medium storing a computer program of instructions to calculate a workforce requirement for operators in a contact center, wherein the instructions, when executed by a computing device, cause the computing device to perform operations comprising:

accepting input parameters including at least call volume in a particular period of time, an average handle time for a call by the operator, and a maximum queuing time before abandoning queuing of a call;

initializing a number of the operators;

calculating a probability of queuing of the call using an Erlang C formula based upon at least the call volume and the number of the operators;

calculating a call abandonment rate as a service objective by multiplying the probability of queuing of the call and a probability that a handle time of the operator is at least the maximum queuing time in an exponential distribution, wherein the exponential distribution includes the maximum queuing time multiplied by a result of the call volume minus the number of the operators and further divided by the average handle time; and calculating the workforce requirement for operators in order to meet a predetermined service objective by recurrently repeating the calculating of the probability of queuing of the call and the calculating of the call abandonment rate, with respect to an increase and a decrease in the number of the operators.

10. The non-transitory computer-readable medium according to claim 9, wherein the computer program further comprises instructions that, when executed by the computing device, cause the computing device to perform operations comprising:

calculating a response rate within a set period of time as a second service objective based upon the probability of queuing of the call; and calculating the workforce requirement for operators in order to meet a predetermined service objective by recurrently repeating the calculating of the probability of queuing of the call and the calculating of the response rate within a set period of time with respect to an increase and a decrease in the number of the operators.

11. The non-transitory computer-readable medium according to claim 9, wherein the computer program further comprises instructions that, when executed by the computing device, cause the computing device to perform operations comprising:
   accepting an input of availability of the operators for each day of the week and for each predetermined period of time of day; and
   adjusting the workforce requirement for operators according to the availability.

12. The non-transitory computer-readable medium according to claim 9, wherein the computer program further comprises instructions that, when executed by the computing device, cause the computing device to perform operations comprising:
   accepting an input of absence rate of the operators for each day of the week and for each predetermined period of time of the day; and
   adjusting the workforce requirement for operators according to the absence rate.

* * * * *